Dec. 16, 1952  H. DOYLE  2,621,754
GAS SCRUBBER

Filed April 12, 1949  2 SHEETS—SHEET 1

INVENTOR
HAROLD DOYLE
*P. Harold Hughes*
atty.

Dec. 16, 1952   H. DOYLE   2,621,754
GAS SCRUBBER

Filed April 12, 1949   2 SHEETS—SHEET 2

INVENTOR

HAROLD DOYLE atty.

Patented Dec. 16, 1952

2,621,754

UNITED STATES PATENT OFFICE 2,621,754

GAS SCRUBBER

Harold Doyle, Trail, British Columbia, Canada, assignor to The Consolidated Mining and Smelting Company of Canada, Limited, Montreal, Quebec, Canada, a corporation of Canada Application April 12, 1949, Serial No. 87,075

7 Claims. (Cl. 183—7)

This invention relates to a method and apparatus for separating from gases particles carried in suspension by said gases and is particularly directed to the separation of finely divided particles which ordinarily cannot be separated from gases efficiently and economically by conventional methods and apparatus.

Methods and apparatus for removing suspended material from gases are well known and are widely used, for example, spray towers, centrifugal scrubbers, bag filters, cyclone separators and electrostatic precipitators. Ordinarily, a gas cleansing method and/or apparatus is selected with regard to the nature of the gas and materials to be treated, and with regard also to economic considerations upon which may depend the extent to which the gas can be purified.

A serious problem in the separation of suspended particles from gases is the removal of the more finely divided particles, as the difficulty and cost of separation increase as particle size decreases. This problem is particularly acute in the treatment of gases containing suspended particles of submicron size.

An important object of this invention is to provide a method and apparatus by means of which suspended particles may be separated from gases with a high degree of efficiency and relatively inexpensively over a wide range of particle sizes.

A further important object of the invention is to provide a method and apparatus for the treatment of industrial gases for the substantially complete removal of all the suspended particles contained therein or entrained therewith.

A further object of the invention is to provide a novel method and apparatus for separating suspended particles of submicron size from gases.

The method of the present invention comprises, in general, ejecting a gas stream containing suspended particles and flowing at high velocity against the surface of a scrubbing liquid and reflecting the gas stream from the surface of the scrubbing liquid to flow therefrom at relatively low velocity, whereby the suspended solids are driven into and retained by the scrubbing liquid, and subsequently separating the resulting liquid spray from the gas stream.

The apparatus of the present invention comprises, in general, a closed container adapted to receive a bath of scrubbing liquid, a gas inlet conduit extending into said container and having an outlet above the base thereof, a gas outlet from said container, means for admitting scrubbing liquid into said container, and means for regulating the volume of scrubbing liquid in said container.

An understanding of the manner in which the above and other objects of the invention are attained may be had from the following description, reference being made to the accompanying drawings, in which.

Like reference characters refer to like parts throughout the specification and drawings.

Figure 1:
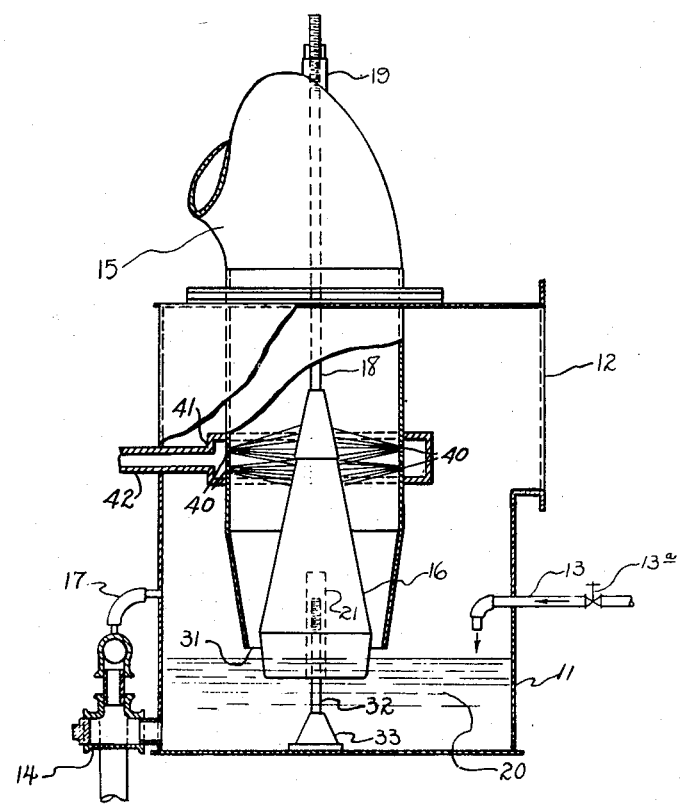
Figure 1 is an elevation partly in section and partly broken away of a gas scrubber incorporating the features of the present invention.

Referring to Figure 1, the numeral 11 indicates a closed container adapted to receive a bath of scrubbing liquid. This container 11, referred to hereinafter as a splash tank, is a closed vessel formed, for example, of wood, concrete or metal. It may be of rectangular or circular shape and is of a size suitable for the gas stream it is designed to treat.

An opening 12 is provided at one side of the tank which is adapted to be connected to a gas outlet conduit 30. This opening 12 provides an outlet for the mixture of gas and spray from the splash tank and is positioned well above the normal level of the bath of scrubbing liquid, preferably being adjacent to the top of the tank as shown.

An inlet 13 for scrubbing liquid is provided for the splash tank. This inlet is connected to a source of scrubbing liquid, not shown, and is preferably provided with a valve 13a for regulating the flow of liquid to the container. The splash tank is also provided with an outlet drain 14 through which scrubbing liquid may be withdrawn. The volume of scrubbing liquid in the tank is preferably maintained relatively constant by regulating the rate of ingress and egress, having regard, of course, to the amount of scrubbing liquid carried out of the tank as a spray by the stream of gas flowing through the outlet 12. The outlet drain 14 extends outwardly from a point adjacent to the bottom of the tank and thence extends upwardly outside the tank to an uppermost level at a point in alignment with the desired level of the liquid bath and a short distance below the outlet end of the inlet gas conduit, and then extends downwardly to a point below the bottom of the tank. A conduit 17 extends from the uppermost level of the outlet 14 to the container and opens into the container at a point above the outlet end of the inlet gas conduit. The arrangement of the outlet drain 14 and the conduit 17 is designed to release any gas entrained with the slurry withdrawn through the drain 14 and return the gas to the tank, thus preventing the locking of gas in the drain which would interfere with the continuous flow of slurry through the drain. Also, this gas-lock release arrangement prevents any siphoning of the liquid from the tank when the gas flow through the scrubber is stopped.

A gas inlet conduit 15 extends from a source of gas to be treated into the splash tank. Preferably, this gas conduit extends downwardly through the top of the splash tank to terminate in an outlet 31 above the surface level of the bath of scrubbing liquid.

A throttle 16, preferably cone-shaped, is concentrically positioned in the conduit 15 adjacent to the outlet end thereof, with the tapered end extending upwardly into the conduit. The throttle 16 is preferably adjustably mounted in the orifice to permit regulation of the size of the channel between the throttle and the internal wall of the conduit. A satisfactory arrangement for adjusting the throttle is illustrated in Figure 1, but other suitable arrangements could also be used. According to Figure 1, a post 32 is carried by a base 33 positioned approximately at the centre of the base of the tank. The upper end of this post is threaded into a collar 21 which is fitted into the base of the throttle. A rod 18 extends from the apex or upper end of the throttle and extends through the wall of the conduit 15, being journalled in a gland or housing 19 in a bend of the conduit 15. The position of the throttle in its relation to the outlet 31 may be regulated by turning the rod 18 in one direction which raises the throttle into the outlet and thus increases the restriction, or in the opposite direction which lowers the throttle out of the outlet and thus increases the space for the flow of gas between the throttle and the conduit. In its adjusted position, the throttle is held firmly in place by the collar 21.

The outlet end of the conduit 15 is preferably tapered inwardly so that, in combination with the throttle, the effective cross-sectional area of the channel for the flow of gas can be adjusted thus to control the velocity of the gas discharged from the conduit.

Figure 2:
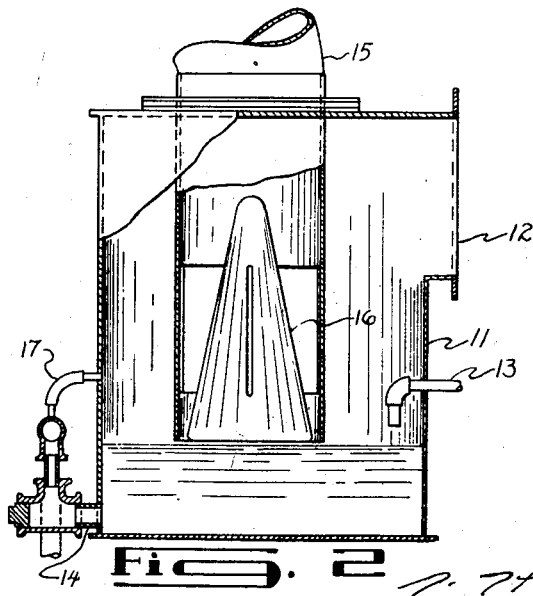
Figure 2 is an elevation partly in section and partly broken away of the gas scrubber illustrated in Figure 1 showing the flow of gases and scrubbing liquid through the scrubber.
Figure 3:
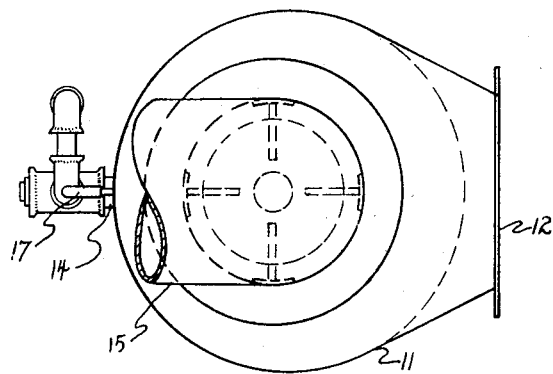
Figure 3 is a top plan view of the scrubber and associated parts.

The tank illustrated in Figures 1 and 2 is drawn to the approximate scale of an inch to a foot. This tank is about three feet in diameter and three feet nine inches high. The gas conduit 15 is about eighteen inches in diameter above the throttle and tapers to about thirteen inches at the outlet end. The throttle is about eleven inches in diameter at its widest point and tapers to the diameter of the rod 18. The outlet opening 12 and conduit connected thereto are about eighteen inches in diameter.

It is found that an installation of this size is suitable for a rate of gas flow of the order of 40 feet per second for 4,000 c. f. m. entering the splash tank through an eighteen-inch conduit. For example, with an untapered eighteen-inch conduit, the velocity of the gas flow is increased from about 40 feet per second to about 100 feet per second when the shortest distance between throttle and conduit is 2 inches, and to about 200 feet per second when the shortest distance between throttle and conduit is 1 inch.

In the treatment of gas at low velocities and/or with heavy, sticky dust burdens, it may be desirable to wash the surface of the throttle by means of sprays adapted to inject scrubbing liquid on the surface of the throttle. This modification may be employed to supplement the liquid bath by injecting scrubbing liquid at low velocity and in the form of coarse droplets into the gas stream ahead of or around the throttle. A suitable arrangement is illustrated in Figure 1 in which a header 41 encircles the conduit 15 at a point adjacent to the upper end of the throttle member 16. The header 41 is connected to a pipe 42 which is connected to a source of scrubbing liquid such as water. Sprays 40 connected to the header are spaced around the internal wall of the conduit 15 and are directed towards the surface of the upper end of the throttle.

In operation, a gas containing suspended matter flows under enforced velocity through the gas conduit 15, which may be the discharge conduit from an industrial process such as a drying, a grinding, a roasting, a burning, or a smelting operation. As the gas passes the throttle 16, its velocity is substantially increased as a result of the gradual reduction in the effective cross-sectional area of the conduit, and the gas is discharged into the splash tank 11 as an annular stream flowing at high velocity. This annular gas stream impinges directly on the surface of the bath of scrubbing liquid and is reflected upwardly towards the top of the splash tank. The inter-action of the high velocity gas stream and the surface of the liquid bath results in a splash effect which forms a dense spray. The material suspended in the gas stream flowing from the gas conduit 15 is driven into the surface of the bath and separated from the gas and retained by the liquid, and the cleansed gas passes out of the splash tank through the outlet conduit 30 into a spray eliminator 35 which may be of conventional design and which separates the entrained spray from the gas. After separation from the spray, the cleansed gas may be exhausted to the atmosphere or recirculated or used in other processes, according to prevailing requirements.

The particles suspended in the gas are collected as a sludge in the liquid bath and it is therefore preferred to change the bath continuously to ensure consistent and efficient operation. The volume of the bath is depleted to some extent by the amount of spray entrained with the outlet gas from the spray tank. Although this entrained liquid can be recovered from the spray eliminator, sufficient liquid should be continuously added to the bath to maintain a relatively constant bath volume. Fresh scrubbing liquid is fed into the splash tank as required through conduit 13 and the drain 14 is arranged to maintain the bath at a predetermined level.

The depth of the liquid bath is normally from six to eighteen inches, depending on the volume and velocity of the gas. A depth of about nine inches has been found to be satisfactory for gas volumes of the order of from about 4,000 to 6,000 cubic feet per minute at velocities of the order of 150 feet per second.

The surface of the liquid bath when quiescent should be close to the discharge level of the gas conduit, within, for example, one-half inch or less. Differences greater than two or three inches may result in lowered efficiency at relatively low velocities.

The amount of liquid flowing through the splash tank should be varied according to the amount of solid matter collected in the liquid bath and, also, according to the extent to which the gas is to be cooled during the scrubbing operation. Usually the rate of flow of the scrubbing liquid is of the order of one-half to five gallons per thousand cubic feet of gas.

The apparatus may be designed for a wide range of gas velocities. Normal gas velocities at the discharge end of the conduit may vary from 50 feet per second to 250 feet per second for satisfactory operation. Velocities below about 50 feet per second result in a corresponding decrease in scrubbing efficiency. Velocities above about 250 feet per second may be employed but usually are not required and may be impracticable in many cases for economic reasons.

In practice, a gas scrubber of the present invention would be designed to treat a certain volume of gas moving at a predetermined velocity, for example, of the order of 150 feet per second. The throttle preferably would be adjustable in order that the maximum operating efficiency could be maintained within a velocity range of, for example, from 125 feet per second to 175 feet per second.

The gas velocity used ordinarily would depend on the nature of the suspended material, higher velocities being desirable for material that is very finely divided and difficult to remove from the gas. Relatively low velocities can be used with material more amenable to scrubbing treatment.

Gas volumes up to 10,000 cubic feet per minute, and higher, may be treated conveniently in a single unit of the present design. However, for gas volumes appreciably greater than 10,000 cubic feet per minute it may be more convenient to use two or more units arranged in parallel. In certain instances, it may be preferable to arrange two or more units in series. For example, one unit may operate at a gas velocity of the order of 100 feet per second to remove part of the burden suspended in the gas being treated, and a second unit in series with the first may operate at a gas velocity of the order of 125 feet per second to remove the more finely divided suspended material.

Dust burdens varying from 1 mg. per cubic foot up to 500 mg. per cubic foot may be treated effectively according to the method and apparatus of the present invention. Gas containing higher dust burdens can also be treated, but it is usually desirable with burdens above 200 mg. per cubic foot to utilize a conventional spray tower or cyclone separator to remove the heavier constituents before treating the gas by the present method and apparatus. The gas can be cleaned substantially completely by the present method and apparatus, the exhaust gas containing only of the order of 0.25 to 0.1 mg. per cubic foot of suspended matter or less, under normal conditions of operation.

Draft requirements for the passage of the gas past the throttle and through the splash tank and spray eliminator to the atmosphere may be of the order of from 2 to 20 inches of water depending upon such factors as gas volumes and velocities. Generally, the draft requirement through the splash tank is about 1.5 times the velocity pressure at the throttle.

In the present method, contact between gas and scrubbing liquid is effected at the highest practicable velocity. The energy of the gas stream is expended as work done on the scrubbing liquid and to ensure the maximum expenditure of energy in this manner, the gas stream is caused to change its direction of flow by reflecting it from the scrubbing liquid.

For best results, all the gas should make contact with and be reflected from the scrubbing liquid. To ensure such action, the width of the discharge opening between throttle and conduit should not be more than two or three inches. With greater widths, some of the gas flowing from the conduit may escape contact with the scrubbing liquid, with a resultant decrease in scrubbing efficiency.

The method and apparatus of the present invention are widely applicable and have been found to be very effective for the removal of fly ash, dust, and other finely divided solids from industrial exhaust gases. The following example refers to the treatment of fly ash from boiler plants.

Exhaust gas from a boiler plant fired with pulverized coal contained a dust burden of about 200 mg. per cubic foot of gas after passage through a dry dust collector. This exhaust gas was passed first through a conventional spray tower to cool the gas and to remove the coarser constituents of the dust burden. The gas was then passed through a series of two splash tank and throttle installations, such as that described and illustrated herein. The gas velocity was of the order of 80 feet per second past the first throttle and 100 feet per second past the second throttle. The gas from the second splash tank was passed through a spray eliminator and then exhausted by means of a fan to the atmosphere. The overall pressure drop from the spray tower inlet to the atmosphere was 10 inches of water, and the overall requirement of scrubbing liquid, which was water in this instance, was from 3 to 5 gallons of water per thousand cubic feet of gas. The overall scrubbing efficiency on the 200 mg. per cubic foot dust burden exceeded 99.5%.

There are many industrial fumes and smokes which comprise suspended matter that is extremely difficult to recover. This suspended matter is usually composed of particles of submicron size and does not respond to treatment by conventional means such as centrifugal scrubbers, bag filters, or electrostatic precipitators, within limits of economic design. For example, suspended components in the fume evolved when drying fertilizer products, such as ammonium phosphate obtained by ammoniation of phosphoric acid produced by reacting sulphuric acid with phosphate rock, may be discharged to atmosphere as a visible blue haze, although the concentration of suspended matter in the gas exhausted to the atmosphere is only about 1 or 2 mg. per cubic foot.

Figure 4:
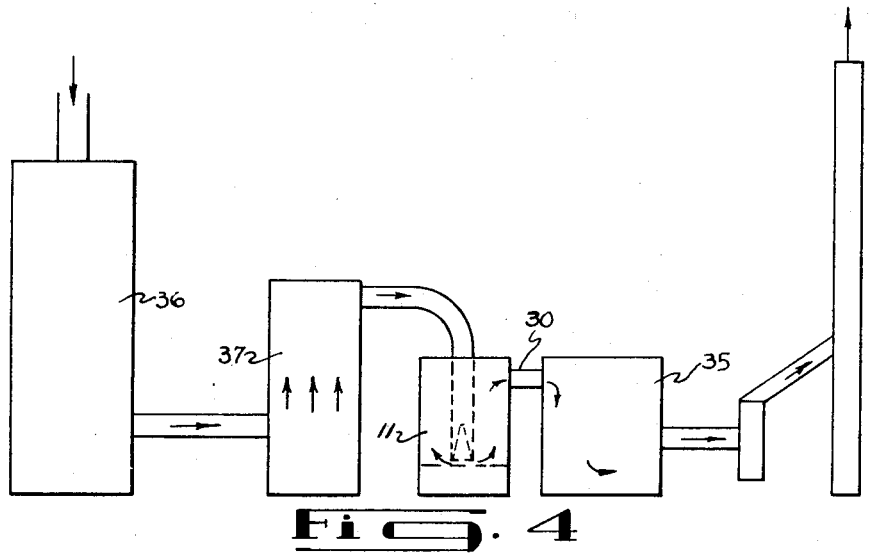
Figure 4 is a diagrammatic view illustrating a preferred embodiment of the invention.

Such elusive material can be substantially eliminated and recovered by treating the gas according to the system illustrated in Figure 4. The gas is first passed through a conventional spray tower 36 to cool it and to remove the relatively coarse material. The cooled and partially cleansed gas may then be passed through a conventional electrostatic ionizer 37 which conditions the aerosols and ultra-microscopic particles. The gas may then be treated according to the method and apparatus described herein. The overall efficiency of this system without the electrostatic ionizer may be as high as 97%, and yet the concentration of visible blue haze discharged to atmosphere may not be markedly reduced. By inserting the electrostatic ionizer into the system ahead of the splash tank, the overall efficiency of the cleansing is increased to the order of 99.5%, with a concentration of only 0.2 mg. or less per cubic foot of suspended matter in the gas exhausted to the atmosphere, and the blue haze is completely eliminated.

The principal function of the electrostatic ionizer is to ionize the suspended particles, which can then be more easily removed from the gas stream in the splash tank. The conditioning of the particles effected by the electrostatic ionizer is not fully understood but it may be that some agglomeration of the particles is obtained and it appears that there is some other electrostatic charge effect which renders the particles amenable to treatment by the scrubbing method and apparatus of the present invention. The design and voltage requirements of the electrostatic ionizer are similar to those of an electrostatic precipitator except that the ionizer requires only a fraction of the electrode area.

It will be understood, of course, that modifications may be made in the preferred embodiment of the invention described and illustrated herein without departing from the scope of the invention as defined by the appended claims.

What I claim as new and desire to protect by Letters Patent of the United States is:

1. Apparatus for treating industrial gases which comprises a closed container adapted to receive a bath of liquid, an inlet gas conduit extending vertically downwardly into said container and having an outlet spaced above but adjacent to the level of the bath of liquid when quiescent, a cone-shaped throttle member concentrically disposed in said gas conduit adjacent to the outlet end thereof adapted to increase the velocity of the gas at the point of discharge from said conduit, an outlet gas conduit in the upper part of said container above the level of the outlet end of said inlet gas conduit, and means for maintaining a relatively constant volume of liquid in said container including an inlet for liquid in said container, a liquid outlet in the lower part of said container, and means for separating gas from the liquid passing through said liquid outlet.

2. Apparatus for treating industrial gases which comprises a closed container adapted to receive a bath of liquid, an inlet gas conduit extending vertically downwardly into said container and having an outlet spaced above but adjacent to the level of the bath of liquid when quiescent, means including a cone-shaped throttle member concentrically disposed in said gas conduit adjacent to the outlet end thereof adapted to increase the velocity of the gas at the point of discharge from said conduit, an outlet gas conduit in the upper part of said container above the level of the outlet end of said inlet gas conduit, an inlet for liquid in said container, a liquid outlet in the lower part of said container, said liquid outlet including a conduit which extends upwardly outside said container to an uppermost level adjacent to and below the outlet end of said inlet gas conduit thence downwardly to a level below the bottom of said container, and a conduit extending from the uppermost level of said liquid outlet and opening into said container at a level above the outlet end of said inlet gas conduit.

3. Apparatus for treating industrial gases which comprises a closed container adapted to receive a bath of liquid, an inlet gas conduit extending vertically downwardly into said container and having an outlet spaced above but adjacent to the level of the bath of liquid when quiescent, a cone-shaped throttle member concentrically disposed in said gas conduit adjacent to the outlet end thereof adapted to increase the velocity of the gas at the point of discharge from said conduit, means for regulating the distance between the wall of said throttle member and the wall of said gas conduit, an outlet gas conduit in the upper part of said container above the level of the outlet end of said inlet gas conduit, and means for maintaining a relatively constant volume of liquid in said container including an inlet for liquid in said container, a liquid outlet in the lower part of said container, means for separating gas from the liquid passing through said liquid outlet, and means for returning said last mentioned gas to said container at a point above the outlet end of said inlet gas conduit.

4. Apparatus for treating industrial gases which comprises a closed container adapted to receive a bath of liquid, an inlet gas conduit extending downwardly into said container and having an outlet above and adjacent to the surface of the bath, means including a cone-shaped throttle member concentrically disposed in said gas conduit adjacent to the outlet end thereof for discharging gas at high velocity from said conduit, means for spraying the surface of said throttle member with liquid, an outlet gas conduit in the upper part of said container, a liquid outlet adjacent to the bottom of said container, and means including a gas-lock release in said liquid outlet for maintaining a relatively constant volume of liquid in said container.

5. Apparatus for treating industrial gases which comprises electrostatic means for ionizing particles suspended in a gas stream, a closed container adapted to receive a bath of liquid, a gas conduit connected to the outlet from said ionizing means and extending downwardly into said container and having a discharge opening above and adjacent to the surface of the bath, means including a cone-shaped throttle member concentrically disposed in said discharge opening for discharging gas at high velocity from said conduit, an outlet gas conduit in the upper part of said container, an inlet for liquid in said container, a liquid outlet adjacent to the bottom of said container, means including a gas-lock release in said liquid outlet for maintaining a relatively constant volume of liquid in said container, and means communicating with said outlet gas conduit for removing liquid entrained in the gas discharged from said container.

6. The method of separating suspended particles from industrial gases which comprises injecting a narrow stream of gas and particles vertically downwardly into a bath of liquid at a velocity at least sufficient to splash the liquid and to drive into the liquid bath the particles suspended in the gas stream, reversing once the direction of gas flow in the liquid bath to separate said particles from the gas, thereby retaining said particles in the liquid, maintaining a relatively constant volume of liquid in the bath by continuously adding liquid thereto and withdrawing therefrom liquid containing said particles and gas entrained in said liquid, separating the entrained gas from the liquid withdrawn from the liquid bath and passing the entrained gas to the reversed gas stream, and discharging from contact with the liquid bath the reversed gas stream substantially free from said particles.

7. In a process for treating gases for the removal of particles suspended therein, the steps of ionizing the particles entrained with the gases, ejecting a narrow stream of gas vertically downwardly into a bath of liquid maintained at a relatively constant volume, the gas being ejected into the bath at a velocity sufficient to produce a dense spray thereby driving into the liquid bath the particles suspended in the gas stream, reflecting the gas stream from the liquid bath, and separating the liquid spray from the gas stream.

HAROLD DOYLE.

REFERENCES CITED

The following references are of record in the file of this patent:

UNITED STATES PATENTS

| Number | Name | Date |
|---|---|---|
| 1,079,849 | Ernst | Nov. 25, 1913 |
| 1,176,747 | Ferguson | Mar. 28, 1916 |
| 1,785,592 | Nolze | Dec. 16, 1930 |
| 1,817,265 | Pando | Aug. 4, 1931 |
| 1,920,437 | Sillers | Aug. 1, 1933 |
| 2,100,155 | Beran | Nov. 23, 1937 |
| 2,380,065 | Newcomb | July 10, 1945 |
| 2,473,672 | Ziliotto | June 21, 1949 |

FOREIGN PATENTS

| Number | Country | Date |
|---|---|---|
| 307,707 | Great Britain | Jan. 16, 1930 |
| 497,238 | Germany | May 5, 1930 |
| 105,273 | Sweden | June 25, 1942 |